(12) United States Patent
Schmidt et al.

(10) Patent No.: US 8,444,190 B2
(45) Date of Patent: May 21, 2013

(54) LATCHING DEVICE FOR MULTIPART HOUSINGS

(75) Inventors: Martin Schmidt, Luebbecke (DE); Frank Quast, Bielefeld (DE); Klaus Olejarz, Loehne (DE)

(73) Assignee: Harting Electric GmbH & Co. KG (DE)

( * ) Notice: Subject to any disclaimer, the term of this patent is extended or adjusted under 35 U.S.C. 154(b) by 665 days.

(21) Appl. No.: 12/615,089

(22) Filed: Nov. 9, 2009

(65) Prior Publication Data

US 2010/0140964 A1    Jun. 10, 2010

(30) Foreign Application Priority Data

Dec. 4, 2008  (DE) .......................... 10 2008 060 561

(51) Int. Cl.
*E05C 3/04*        (2006.01)
*E05C 19/10*       (2006.01)

(52) U.S. Cl.
USPC ............. 292/202; 292/200; 292/203; 292/85; 292/89; 292/102; 292/209; 292/303; 292/DIG. 11; 292/DIG. 30; 292/DIG. 37

(58) Field of Classification Search
USPC ................ 292/200, 202, 203, DIG. 37, 8, 10, 292/11, 80, 81, 83, 85–91, 95, 96, 98, 99, 292/101–103, 105, 107, 108, 116, 119, 120, 292/194, 197, 198, 204, 209, 210, 212, 232, 292/234, 237, 238, 256.5, 257, 300, 303, 292/353, DIG. 8, DIG. 10, DIG. 11, DIG. 16, 292/DIG. 27, DIG. 30, DIG. 48, DIG. 50, 292/1, 121, 127, 219, 220, 227, 336.3, 347, 292/DIG. 31, DIG. 53, DIG. 63, DIG. 38; 220/210, 315, 284, 324, 326; 70/63, 69–71, 70/73, 77–79, 81, 158, 360, 432, 159–163, 70/166–173, 208, 361
See application file for complete search history.

(56) References Cited

U.S. PATENT DOCUMENTS 668,019  A  *  2/1901  Reid ............................ 292/241
1,196,064  A  *  8/1916  Zbytniewski et al. ........ 292/170

(Continued)

FOREIGN PATENT DOCUMENTS

| CH | 257902   | 10/1948 |
|----|----------|---------|
| DE | 39 10 109 | 10/1990 |
| EP | 1 046 769 | 10/2000 |
| GB | 208947   | 1/1924  |

OTHER PUBLICATIONS

European Examination Report issued in underlying EP application, 10 2008 060 561.1, dated Jun. 9, 2010 (3 pgs).

*Primary Examiner* — Carlos Lugo
*Assistant Examiner* — Alyson M Merlino
(74) *Attorney, Agent, or Firm* — Hayes Soloway P.C.

(57) ABSTRACT

A latching device for at least two housing parts, in which a snap-on connection as well as a latching connection between the housing parts is produced by a correspondingly designed rotary knob/pushbutton function. The actuating button preferably is respectively arranged on two opposing sidewalls of an upper housing part, wherein the actuating button respectively acts upon a spring lever that is arranged on the inner wall of the upper housing part.

During assembly of the upper housing part and a lower housing part, a forced snap-on connection between the two housing parts is produced and can only be disengaged again by exerting pressure upon the actuating buttons on both sides.

9 Claims, 6 Drawing Sheets

U.S. PATENT DOCUMENTS

| | | | | |
|---|---|---|---|---|
| 1,947,282 A * | 2/1934 | Theis | | 74/553 |
| 2,153,819 A * | 4/1939 | Van Voorhees | | 292/164 |
| 2,334,012 A * | 11/1943 | Koch et al. | | 220/244 |
| 2,696,100 A * | 12/1954 | Nehls | | 70/455 |
| 3,100,980 A * | 8/1963 | Humphries | | 70/71 |
| 3,146,010 A * | 8/1964 | Dellith | | 292/212 |
| 3,425,587 A * | 2/1969 | Duross, Jr. | | 220/326 |
| 3,589,152 A * | 6/1971 | Glass et al. | | 70/81 |
| 3,602,017 A * | 8/1971 | Bauer | | 70/78 |
| 3,782,139 A * | 1/1974 | Rubner | | 70/81 |
| 4,007,516 A * | 2/1977 | Coules | | 411/349 |
| 4,195,867 A * | 4/1980 | Baillie | | 292/174 |
| 4,435,966 A * | 3/1984 | Craig | | 70/161 |
| 4,647,093 A * | 3/1987 | Palsson | | 292/251 |
| 4,779,755 A * | 10/1988 | Harris | | 220/203.21 |
| 5,413,392 A * | 5/1995 | Schlack et al. | | 292/204 |
| 5,732,580 A * | 3/1998 | Garnault et al. | | 70/422 |
| 5,860,302 A * | 1/1999 | James | | 70/63 |
| 5,882,053 A * | 3/1999 | Bekins et al. | | 292/336.3 |
| 6,067,827 A * | 5/2000 | Haseley et al. | | 70/370 |
| 6,113,160 A * | 9/2000 | Johansson et al. | | 292/169 |
| 6,116,660 A * | 9/2000 | Langkamp et al. | | 292/65 |
| 6,325,427 B1 * | 12/2001 | Daoud | | 292/27 |
| 6,575,503 B1 * | 6/2003 | Johansson et al. | | 292/170 |
| 7,690,876 B2 * | 4/2010 | Kawai et al. | | 411/45 |
| 7,695,031 B2 * | 4/2010 | Jackson et al. | | 292/169 |

* cited by examiner

LATCHING DEVICE FOR MULTIPART HOUSINGS

BACKGROUND OF THE INVENTION

1. Field of the Invention

The invention pertains to a latching device for an at least two-part housing that features an upper housing part with sidewalls and a corresponding suitable lower housing part.

A latching device of this type is required for selectively holding together two housing halves in a snap-on or a latching fashion and for once again separating said housing halves, wherein a function that is not dependent on external environmental influences needs to be ensured.

2. Description of the Related Art

EP 1 046 769 B1 discloses a pivoting lever closure with a push-button latch for the pivoting lever that is designed for locking switchgear cabinet doors or the like.

SUMMARY OF THE INVENTION

The invention therefore is based on the objective of designing an internal latching device for a two-part housing that is protected from function-impairing environmental influences, wherein it is possible to optically determine from the outside whether the latching device is effective, and wherein the latching device furthermore features a locking function against unauthorized access.

This objective is attained in that an externally operated actuating button is respectively arranged within circular integral structures on at least one of two opposing sidewalls of the upper housing part, in that the actuating button is engaged with a spring lever that is arranged in the interior of the upper housing part, in that the actuating button is realized in the form of a combined rotary knob/pushbutton, and in that the spring lever produces a snap-on connection or a latching connection between the two housing parts in dependence on the position of the actuating button.

The invention concerns a latching device for separably contacting an upper housing part to a lower housing part, wherein the latching device makes it possible to selectively snap together the two housings or to connect the two housings by means of another selectable latching mechanism.

The mechanism for the latching device is integrated into at least one housing wall within one housing half, namely the upper housing part, such that environmental influences are advantageously rendered irrelevant. In addition, no significantly protruding integral elements are required externally.

In this case, only three moving parts are provided in the upper housing part: an actuating button with a seal and a spring lever. The lower housing part, in contrast, is merely provided with an integral element in the form of a snap-on tab for snapping together the housing parts.

The advantages attained with the invention can be seen, in particular, in that the housing halves are initially snapped together automatically with the aid of the latching device during the assembly, and in that the housing halves can only be unlatched again by exerting pressure upon an actuating button that is respectively arranged on two opposing sides of the upper housing part.

In addition, the two housing halves can be advantageously latched together, wherein this latching becomes effective when the actuating button is turned about its axis by 90° after the latching device is engaged such that the simple removal of the upper housing part is initially prevented at least without a tool.

In the region of the actuating button, the upper housing part is sealed against environmental influences by means of a ring seal.

In this case, the seal contains a color marking and is arranged on the actuating button in such a way that the unlatched state is optically indicated by the color marking in the unlatched state, in which the actuating button slightly protrudes from the housing. Once the actuating button is latched, the seal also is no longer visible.

The actuating button is engaged with the spring lever arranged in the interior of the housing. The spring lever consists of an elongated spring-elastic material and is respectively arranged on the inner side of the upper housing part. In this case, the spring lever is movably fixed in the upper housing part in a recess in the respective sidewall by means of two angular holding brackets, wherein the other end of the spring lever features an opening for producing a snap-on connection with a tab on the lower housing part. Another opening is arranged in the spring lever about centrally, wherein an integral shaft of the actuating button extends through said opening.

An integral toggle is provided on the shaft of the actuating button and adjoins the central opening of the spring lever while the other side of the spring lever is provided with a locking hook that is arranged on the end of the shaft and serves for controlling the spring lever by means of the actuating button.

The two housing halves are automatically snapped together during the assembly. The snap-on opening in the spring lever is only disengaged from the snap-on hook in the lower housing part in order to remove the upper housing part by exerting pressure upon two actuating buttons that are preferably arranged on opposing sidewalls of the upper housing part. In order to additionally latch the housing parts, the actuating button needs to be turned by 90°, wherein this actuating button fixes the spring lever on the snap-on hook in such a way that the upper housing part cannot be removed by means of a specially designed mechanical device.

BRIEF DESCRIPTION OF THE DRAWINGS

One embodiment of the invention is illustrated in the figures and described in greater detail below. The figures show.

DESCRIPTION OF THE PREFERRED EMBODIMENTS

Figure 1A:
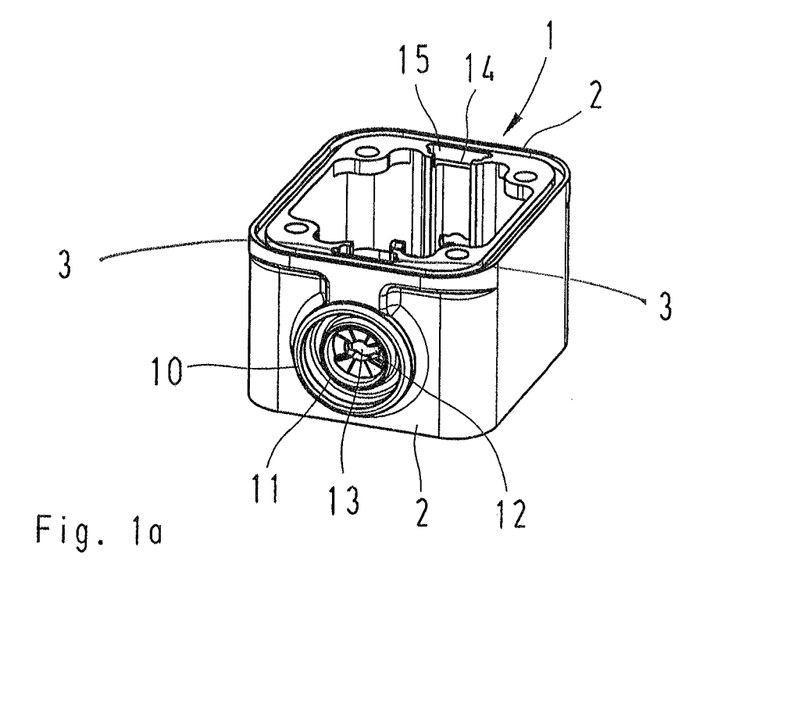
FIG. 1a an upper housing part.

FIG. 1a shows an upper housing part 1 that is suitably shaped for accommodating a latching device with an actuating button 20 in two opposing sidewalls 2, as well as a suitable lower housing part 5.

It should be noted that a cover of the upper housing part 1 with a cable in-feed arranged therein is not illustrated in greater detail in this figure.

Figure 1B:
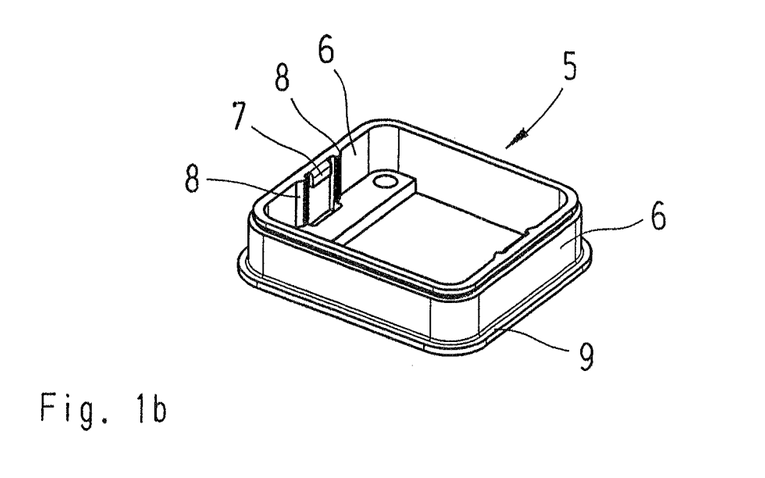
FIG. 1b a lower housing part that is suitable for the upper housing part.

With respect to the frame-shaped lower housing part 5 according to FIG. 1b that is designed for being rigidly screwed over a wall opening and surrounded by a flange 9 for this purpose, the only relevant components are an integral snap-on tab 6 on an inner sidewall 7, as well as a guide rail 8 that is arranged to the left and to the right thereof and spaced apart therefrom.

The upper housing part 1 features integral structures with an outwardly curved, circular outer bead 10 and a second, smaller circular bead 11 that is arranged within the outer bead.

In this case, a few special integral structures including a slot-shaped opening 12 with a central circular opening 13 are provided within the second inner bead 11, wherein the function of these special structures is explained further below.

Figure 2:
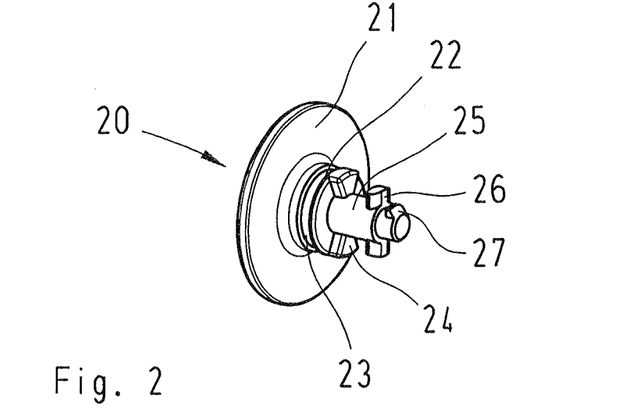
FIG. 2 an actuating button.

FIG. 2 shows the actuating button 20 with a flat thrust washer 21 and an integral pin-shaped structure with different contours for controlling the movement and the locking of the actuating button.

A collar 22 with a peripheral groove 23 is initially attached to the thrust washer 21, and the collar 22 in turn features an integral shaft 25 with a toggle 26 and a locking hook 27 on the end of the shaft.

The face of the collar 22 referred to the shaft 25 features an elevated X-shaped locking structure 24, the importance of which is explained further below.

Figure 3:
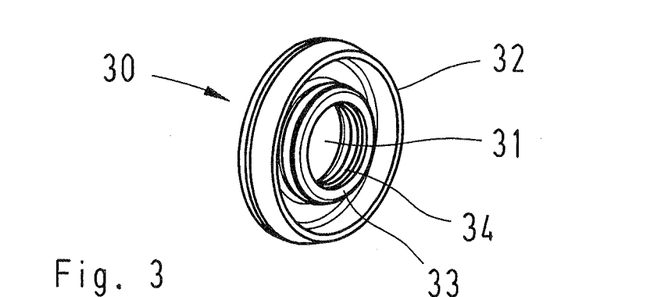
FIG. 3 a ring seal.

FIG. 3 shows a ring seal 30 that is arranged between the actuating button 20 and the upper housing part 1.

The ring seal 30 has a U-shaped cross sectional structure that forms a double lip with an inner lip 33 and an outer lip 32 and is provided with a central circular opening 31, wherein said ring seal is arranged on the sidewall 2 within the first bead 10 and seals the actuating button 20 relative to the upper housing part 1.

Figure 4:
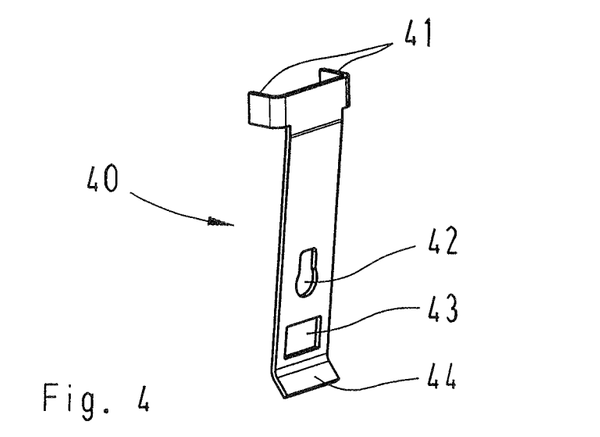
FIG. 4 a spring lever.

FIG. 4 shows a spring lever 40 that is responsible for the snap-on and latching functions together with the actuating button 20. The spring lever is realized in the form of an elongated, strip-shaped stamping of spring-elastic material.

In this case, a U-shaped angular holding bracket 41 that is angled relative to the stamping is provided on the upper end in this figure while the opposite end contains a slightly angled bend 44.

A keyhole opening 42 and a rectangular snap-on opening 43 are stamped into the central straight region of the spring lever.

In this case, the keyhole opening 42 is provided for leading through the shaft 25 of the actuating button 20, wherein the spring lever 40 is held between the toggle 26 and the locking hook 27 of the actuating button 20 while the rectangular snap-on opening 43 is provided for being snapped together with the snap-on tab 7 on the lower housing part 5. The spring lever is guided within the upper housing part in two integral vertical guide rails 3.

Figure 5:
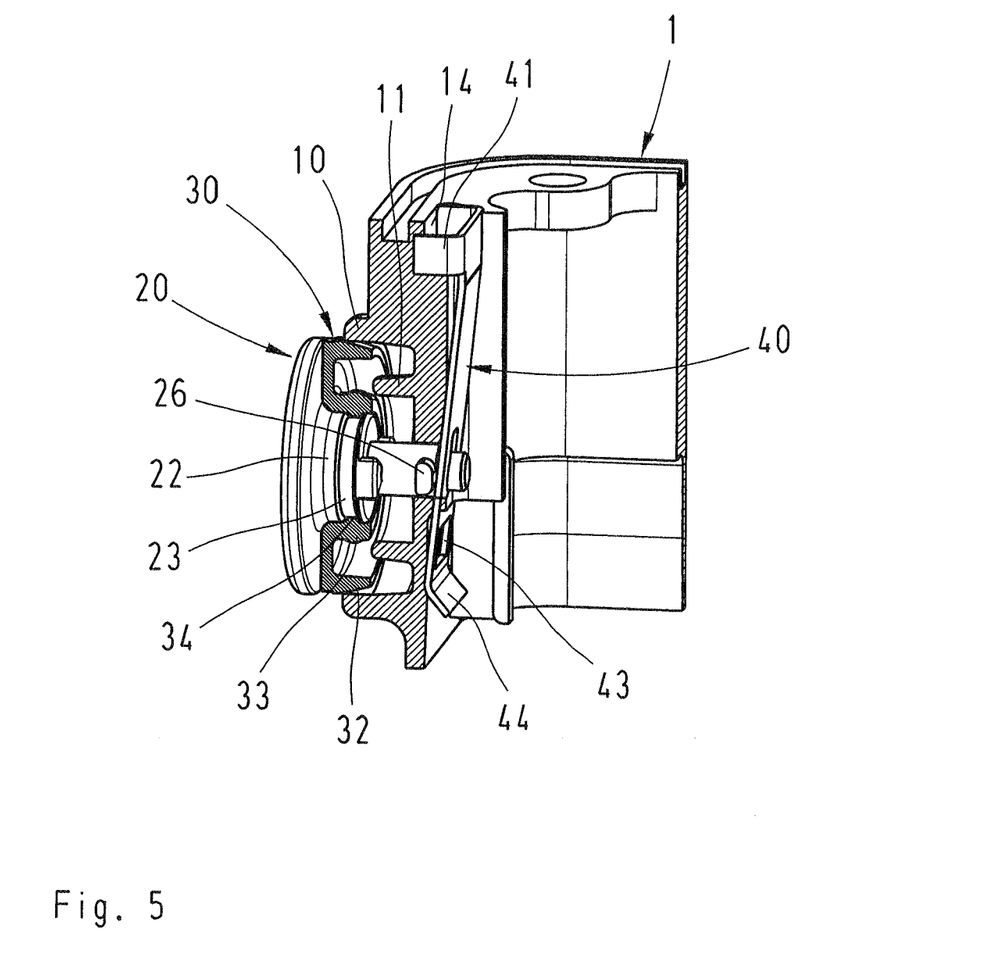
FIG. 5 the function of the latching device when snapping together the attached upper and lower housing parts.

FIG. 5 shows an upper housing part 1 that is snapped together with the lower housing part 5 in the form of a sectional representation.

During the assembly of the two housing parts, the snap-on effect of the latching unit is immediately realized in that a snap-on tab 7 on the lower housing part 5 engages into a snap-on opening 43 of the spring lever 40. This figure shows a section through the center of both beads 10, 11 in one of the sidewalls 2 of the upper housing part 1.

Consequently, the actuating button 20 with its thrust washer 21 is still arranged outside the first outer bead 10.

The ring seal 30 is fixed on the integral structure of the collar 22, wherein said ring seal contains an integral elevated collar 34 that is arranged on the inner lip 33 forming the circular opening 31 and engages into the annular groove 23 provided in the collar 22. In addition, the shaft 25 extends through the slot-shaped and circular openings 12, 13 of the housing wall 2, as well as the keyhole opening 42 of the spring lever 40, wherein the spring lever 40 is held in a movable yet guided fashion on the end of the shaft 25 between the toggle 26 and the locking hook 27.

Figure 6:
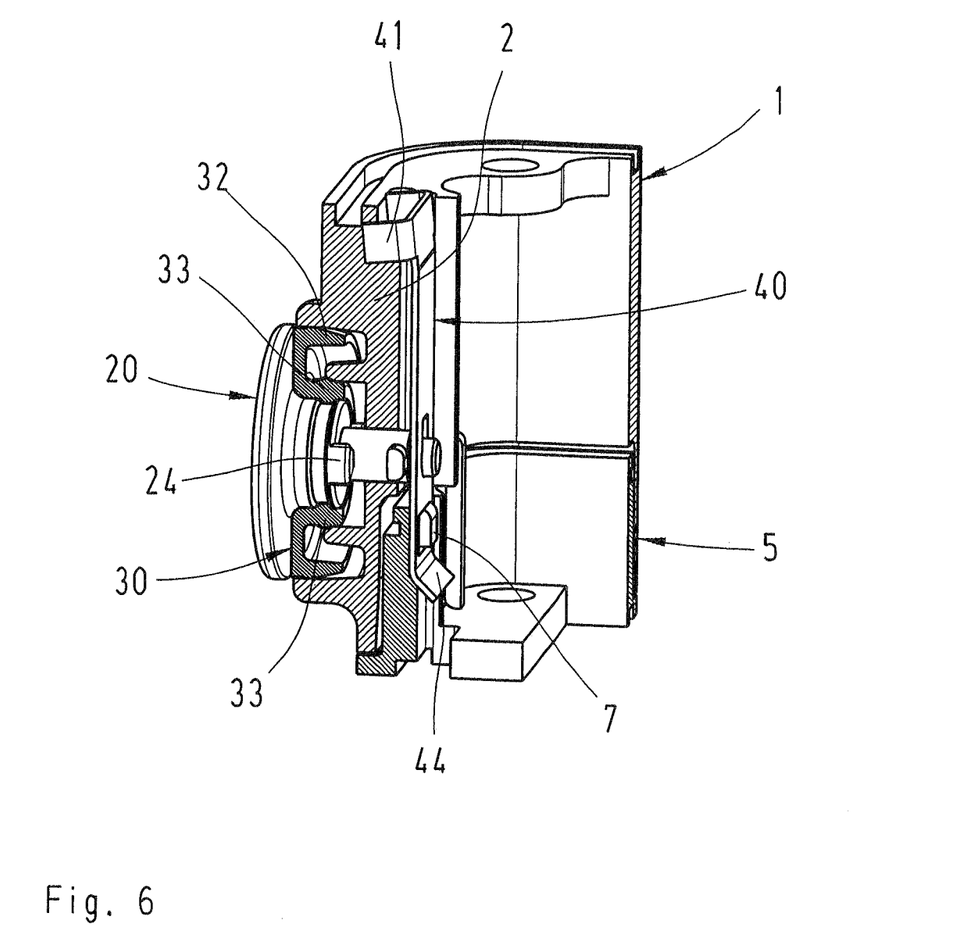
FIG. 6 the function of the latching device when latching an upper housing part to a lower housing part.

FIG. 6 shows an upper housing part 1 that is attached to the lower housing part 5.

In this case, the actuating button 20 is pulled into the first outer bead 10 because the sidewall 6 of the lower housing part 5 is pushed between the sidewall 2 of the upper housing part 1 and the bend 44 of the spring lever 40, wherein the angular holding bracket 41 is supported within a recess 14 in the sidewall 2 of the upper housing part 1 and the spring lever 40 is aligned almost vertically between the lateral sections of the groove 14 and thusly pulls the actuating button 20 toward the housing.

If pressure is exerted upon the actuating button 20 in the position illustrated in FIG. 6, the spring lever 40 is also pressed inward by means of the toggle 26 such that the snap-on opening 43 releases the snap-on tab 7 and the housings 1 and 5 can be separated from one another.

Figure 7:
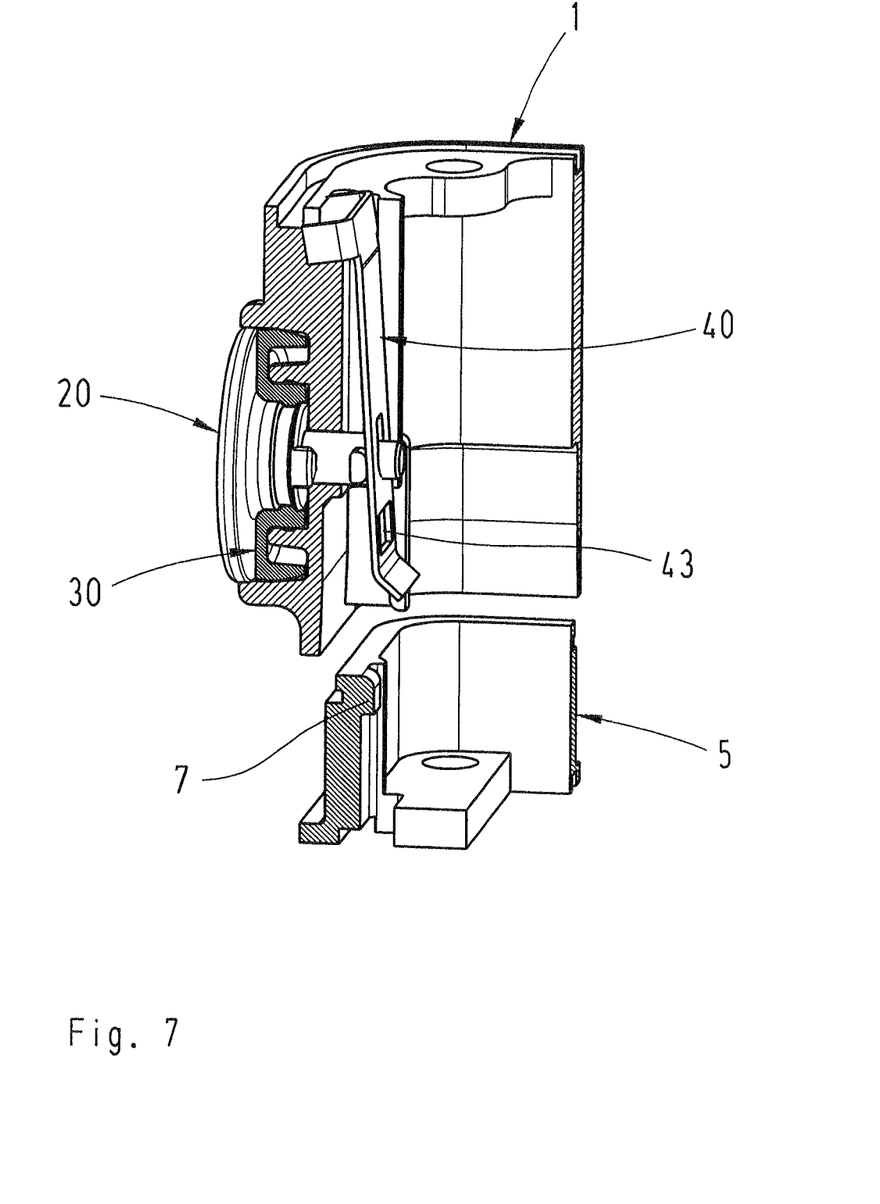
FIG. 7 the function of latching two housings.

This process is illustrated in FIG. 7. Although the two housing halves are already separated from one another in this case, the actuating button is still situated within the outer bead 10 such that the spring lever 40 and is pressed inward by means of the toggle 26 and thusly causes the snap-on opening 43 to be released from the snap-on tab 7.

Figure 8:
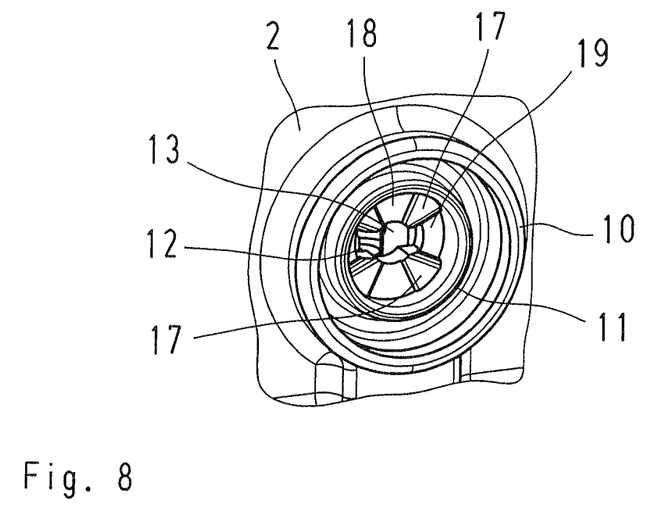
FIG. 8 the mechanism for controlling the latching connection and the snap-on connection, and FIG. 9 a tool opening provided in the actuating button.

The above-indicated structures in the sidewall 2, within the inner bead 11 and the actuating button 20 are responsible for latching together the two housings 1, 5 as explained below with reference to FIG. 8.

The slot-shaped opening 12 with the central circular opening 13 is provided in the center of the inner bead 11.

In addition, the center of the inner bead 11 features a peculiarity in the form of a cruciform structure that is defined by three planes, wherein an elevated X-shaped cross that consists of non-connected cross arms and resembles an Andrews cross initially defines a first outer plane 17 that is followed by a central plane 18 between the cross arms that is aligned vertically in this case and a third lower plane 19 in an extension of the slot-shaped opening 12 that is aligned horizontally between the cross arms in this case.

The actuating button 20 equivalently features a shaft 25 with a toggle 26 that can be inserted into the slot-shaped opening 12 of the inner bead 11 such that the toggle 26 is latched behind the sidewall 2 when the actuating button 20 is subsequently turned by 90°, namely due to the fact that the X-shaped locking contour 24 on the collar 22 of the actuating button 20 is pulled inward up to the third lower plane 19 that represents the laterally reversed negative of the X-shaped locking contour 24, and initially prevented from being additionally turned. During this process, the spring lever 40 is simultaneously latched by means of the locking hook 27 such that the upper housing part 1 is latched to the lower housing part 5.

In the unlatched state of the actuating button 20, part of the colored ring seal 30 in the form of a collar is visible as a status indicator. In the latched state, the actuating button 20 with the ring seal 30 is displaced into the outer bead 10 of the housing such that the colored collar is no longer visible.

Figure 9:
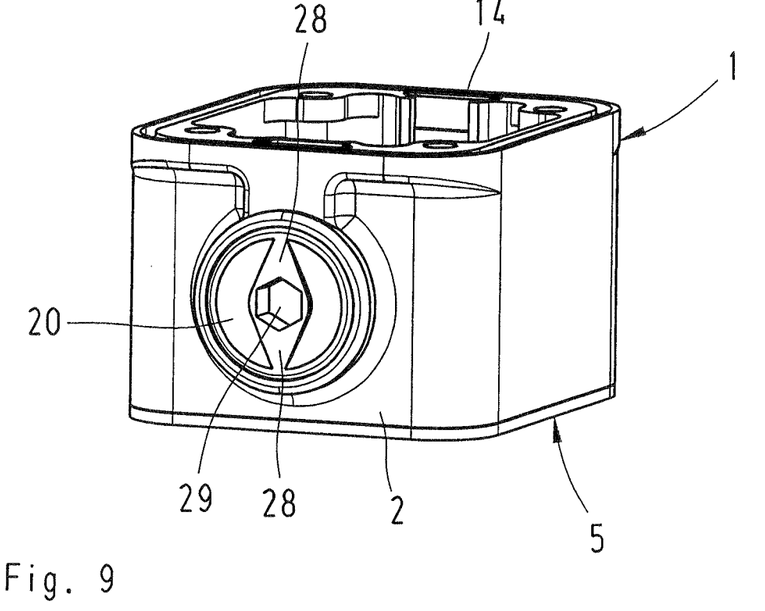

According to another characteristic, accidental or unauthorized unlatching of the actuating button 20 can be prevented, wherein a tool opening 29 that is designed for a hexagonal wrench in this case, but may also have any other shape, is provided on the thrust washer 21 of the actuating button for this purpose—as shown in FIG. 9. Furthermore, a position indicator 28 provided on the thrust washer respectively indicates the snap-on and latching status, wherein the vertical position shown indicates that the two housing halves are merely snapped together.

What is claimed is:

1. A latching device for a two-part housing that features an upper housing part with sidewalls and a corresponding suitable lower housing part, wherein an externally operated moveable and lockable actuating button is respectively arranged within circular integral structures on one of two opposing sidewalls of the upper housing part, the actuating button is engaged with a spring lever that is arranged in an interior of the upper housing part, and the actuating button is in the form of a combined rotary knob/pushbutton, wherein the circular integral structures comprise an outer bead and a smaller inner bead arranged within the outer bead, wherein a slot-shaped opening communicating with a circular opening is provided in the center of the inner bead, wherein the spring lever features a keyhole opening, into which a shaft of the actuating button is hooked between a toggle and a locking hook when the shaft extends through the circular opening, wherein the spring lever produces a snap-on connection and/or a latching connection between the two housing parts in dependence on the state of the actuating button, and wherein the actuating button has an essentially T-shaped structure with a thrust washer, with an axial integral structure that is attached in the form of a collar and contains a peripheral groove, an end of the shaft contains said locking hook with said toggle spaced apart therefrom, wherein within the inner bead, the upper housing part includes a cruciform structure that is defined by three planes, said three planes comprising a first outer plane, a central plane, and a third lower plane, said first outer plane being defined by non-connected cross arms with portions of the central plane being located between adjacent cross arms of the non-connected cross arms and vertically aligned relative to the circular opening, and said third lower plane being horizontally located relative to the portions of the central plane, said three planes cooperate with an elevated X-shaped locking contour on an end of the collar of the actuating button to guide the actuating button between an unlocked state and a locked state.

2. The latching device according to claim 1, wherein the thrust washer is guided within the outer bead.

3. The latching device according to claim 1, wherein a color-marked ring seal is arranged directly behind the thrust washer of the actuating button and between an inner bead and an outer bead of the upper housing, wherein said ring seal is not only provided for fulfilling a sealing function, but also for indicating the locking state of the actuating button.

4. The latching device according to claim 1, wherein the ring seal is realized in the form of a double lip with a U-shaped cross section that is formed by an inner lip and an outer lip with a central opening, wherein the outer lip adjoins the outer bead and the inner lip adjoins the inner bead of the upper housing part.

5. The latching device according to claim 1, wherein the inner lip of the ring seal features a peripheral collar that engages into the peripheral groove in the collar of the actuating button.

6. The latching device according to claim 1, wherein one end of the spring lever features a U-shaped angular holding bracket that extends over a width of the lever, wherein another end of the lever opposite to the one end of the lever features a bend.

7. The latching device according to claim 1, wherein the spring lever is pressed inward in the upper housing part when pressure is exerted upon the actuating button such that a forced snap-on connection produced between a snap-on opening of the spring lever and a snap-on tab in an interior of the lower housing part during the assembly of the two housing parts is engaged.

8. The latching device according to claim 1, wherein the actuating button can be pressed and then turned by 90° to place the actuating button in the locked state, wherein the toggle is pressed through the slot-shaped opening in the center of the inner bead such that the toggle is locked behind the one of the two opposing sidewalls of the upper housing part and the spring lever such that a snap-on opening of the spring lever is snapped together with a snap-on tab of the lower housing part.

9. The latching device according to claim 1, wherein the outside of the actuating button features a position indication symbol, and wherein a center of the outside of the actuating button is provided with a recess for a suitable latching tool.

\* \* \* \* \*